MacKEE B. WALLACE.
PARCEL POST EGG CARRIER.
APPLICATION FILED OCT. 22, 1913.

1,131,579.

Patented Mar. 9, 1915.

WITNESSES:
Charles Pickles
Thos Castberg

INVENTOR
MacKee B. Wallace.
BY G. H. Strong.
ATTORNEY

UNITED STATES PATENT OFFICE.

MacKEE B. WALLACE, OF SAN FRANCISCO, CALIFORNIA.

PARCEL-POST EGG-CARRIER.

1,131,579.  Specification of Letters Patent.  Patented Mar. 9, 1915.

Application filed October 22, 1913. Serial No. 796,627.

*To all whom it may concern:*

Be it known that I, MacKEE B. WALLACE, a citizen of the United States, residing in the city and county of San Francisco and State of California, have invented new and useful Improvements in Parcel-Post Egg-Carriers, of which the following is a specification.

This invention relates to a parcel post egg carrier.

The object of the invention is to provide a simple, substantial, cheaply manufactured wrapper or carrier for each individual egg in a package, which is so constructed that the package containing one or several of such carriers may be subjected to the roughest handling without injuring the egg within the carrier.

Further objects will hereinafter appear.

The invention consists of the parts and the construction and combination of parts as hereinafter more fully described and claimed, having reference to the accompanying drawings, in which—

Figure 1:
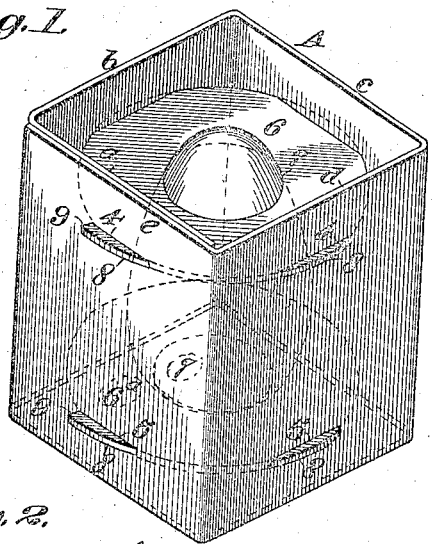
Figure 2:
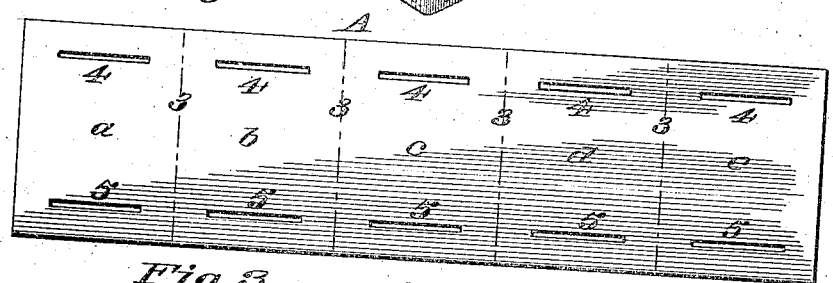
Figure 4:
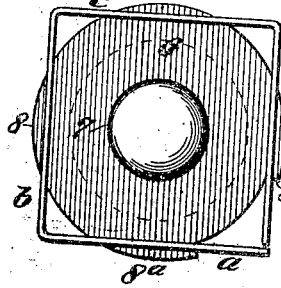
Figure 3:
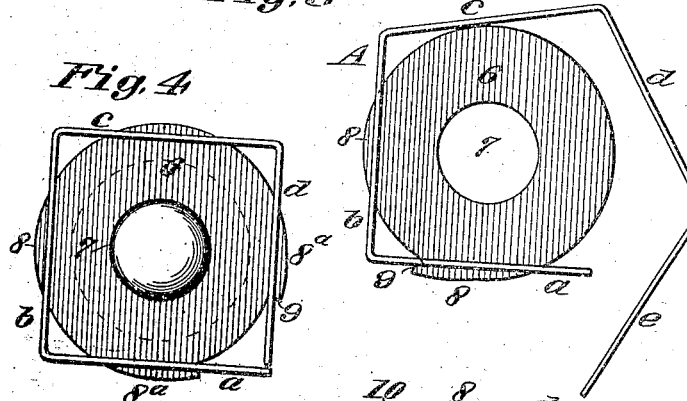
Figure 5:
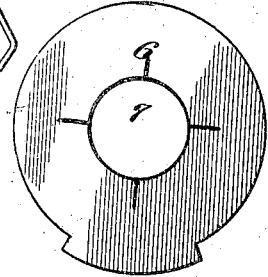
Figure 6:
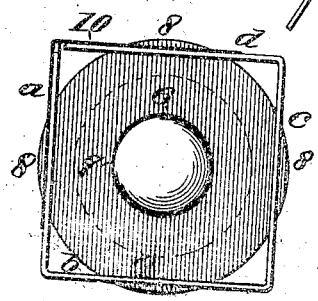

Figure 1 is a perspective view of the invention. Fig. 2 is a plan view showing the wrapper unfolded. Fig. 3 is a plan view showing the position of the wrapper at the time the egg is inserted. Fig. 4 shows the egg supporting disk provided with lugs for retaining the wrapper. Fig. 5 is a view of the egg supporting disk showing a different form of retaining lug. Fig. 6 is an end view of a wrapper and egg supporting disk.

Referring to the drawings, A indicates a cardboard wrapper blanked out substantially as shown in Fig. 2 and creased along the lines 3 to make it easily foldable. Simultaneously with the blanking and creasing operation a series of upper and lower rectangular-shaped slots 4 and 5 are formed near the upper and lower edges of the wrapper. These are provided for the purpose of receiving and supporting a pair of end sections or disks 6 and 6ª. The disks 6 are here shown as circular in form and are provided with central openings 7 which are just sufficiently large to receive the ends of the egg. The egg inclosed by the wrapper will thus be supported at the points of greatest strength in the center of the outside wrapper out of contact with the walls of same.

The preferred form of wrapper, which is shown in Figs. 1 and 2, consists of five foldable slotted sections $a$, $b$, $c$, $d$ and $e$, and the disks especially adapted for use in connection with same are provided with outwardly projecting lugs 8 for the purpose of securing the wrapper with relation to same.

The operation of wrapping an egg is accomplished by first setting the wrapper on edge and bending the sections $a$ and $b$ at right angles to each other, as indicated in Fig. 3. A pair of disks 6 and 6ª are then placed in position by inserting the edges of the disks through the upper and lower slots. The egg is then placed in position between the disks, as indicated in Fig. 1, where the ends of the egg project through the central openings 7. The remaining sections of the wrapper $c$, $d$ and $e$ are then folded in position about the supporting disks 6 and 6ª and are here secured by lugs 8.

By referring to Fig. 3 it will be seen that when first inserting the disks 6 and 6ª the lugs 8 project through one side of the slots in section $a$. They are retained in this position until the wrapper is completely folded and are then turned into the position indicated in Fig. 1, where the slanting edges 9 of the lugs 8 engage with the outer ends of the slots formed in section $e$, thus preventing the outer wrapper section $e$ from unfolding. The changing of the position of the lugs 8 from one side of the slots to the other to retain the wrapper when this is folded is accomplished by grasping any one of the protruding edges of the disks 6 or 6ª and turning the disk. The outside wrapper $a$ is sufficiently larger than the egg to provide considerable space between the egg and the walls of the wrapper, the egg being held and supported in the central position within the wrapper by the disks and the central openings formed in same is thus held at a point where it is least liable to breakage.

By referring to Fig. 4 it will be seen that the disk 6 is provided with two projecting lugs 8ª and that the wrapper in this instance only consists of four foldable sections which are secured in position by the lugs 8ª.

In Fig. 5 another modification is shown which may be used in connection with the wrapper shown in Fig. 1.

In Fig. 6 a plain circular disk is used without any lug projections; the wrapper in this instance also consisting of four foldable sections secured by a gummed label 10.

The different forms of disks and wrappers here shown permit a free circulation of air around the egg at all times, as considerable space is provided between the egg and the main surrounding wrapper. A wrapper thus constructed may be placed in any suitable form of container, either singly or in quantities, and may be safely shipped through the mails as the egg is always contained out of contact with the sides of the container and cannot be injured unless this is practically flattened out by outside pressure. The supporting disks 6 and 6ᵃ practically prevent the carrier from being flattened out, as it would become necessary to double the disks and tear the slots in which they are retained before such flattening action could take place. The egg is furthermore supported at the points of greatest strength and when thus supported may be subjected to severe shocks without breakage. A wrapper constructed as here shown may be cheaply manufactured and can be quickly applied and takes no more space than the common form of egg crates now in use.

The materials and finish of the several parts of the carrier may be such as experience and judgment of the manufacturer may dictate. Three sizes of holes in the disks will be sufficient to accommodate any size of eggs ordinarily met with.

Having thus described my invention, what I claim and desire to secure by Letters Patent is—

1. An individual egg carrier, comprising, an integral strip of material foldable to form a rectangular case of greater interior diameter and length than the diameter and length respectively of the egg, and disks having central openings to receive the ends of the egg to thereby positively retain the periphery of the egg out of contact with the sides of the case, said disks having portions projecting outwardly from the outer side faces of the case and located intermediate the sides of the strip whereby the sides of the strip project beyond the ends of the egg and form ends for the case which ends are each completely open and completely encircle the egg and hold same out of contact with any support on which the ends of the case may be placed.

2. An individual egg carrier consisting of an openable wrapper which encircles the egg sides and which has a series of spaced slots adjacent each end thereof, and a pair of disks each having a single central aperture, said disks being disposed at the respective ends of said wrapper, each disk having a peripherally arranged lug which has an edge which is inclined radially of the disk, the peripheries of the disks extending through the respective slots of the wrapper, said disks being partially rotatable relative to the wrapper to enable the inclined edge of the lug to be brought to engage the outer face of one of the free side walls of the wrapper at a point beyond the ends of the slots through which the lugs pass to hold the wrapper.

3. An egg carrier consisting of an openable wrapper which has a series of spaced slots adjacent each end thereof, and a pair of disks each having an aperture, said disks being disposed at the respective ends of said wrapper, said disks having portions thereof which extend through the respective slots of the wrapper and having their apertures adapted for the reception of the egg ends to hold the eggs against endwise movement and out of engagement with the inner side faces of the wrapper, said disks being rotatable relative to the wrapper, and means on the disks extending through the slots and having a portion located exteriorly of the wrapper adapted to engage the outer face of one of the free ends of the wrapper to hold same against opening movement.

In testimony whereof I have hereunto set my hand in the presence of two subscribing witnesses.

MacKEE B. WALLACE.

Witnesses:
JOHN H. HERRING,
IRVINE SINNETT.